(12) United States Patent
Nakamura et al.

(10) Patent No.: US 9,025,084 B2
(45) Date of Patent: May 5, 2015

(54) VIDEO DISPLAY APPARATUS HAVING A FUNCTION OF ADJUSTING COLOR BALANCE

(71) Applicant: Funai Electric Co., Ltd., Osaka (JP)

(72) Inventors: Yuya Nakamura, Osaka (JP); Masahiro Suzuki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/266,938

(22) Filed: May 1, 2014

(65) Prior Publication Data

US 2014/0340580 A1 Nov. 20, 2014

(30) Foreign Application Priority Data

May 14, 2013 (JP) .................................. 2013-102263

(51) Int. Cl.
*H04N 9/73* (2006.01)
*G06C 13/00* (2006.01)

(52) U.S. Cl.
CPC ...................................... *H04N 9/73* (2013.01)

(58) Field of Classification Search
USPC ...................... 348/223.1, 655, 656, 675, 569; 345/593, 594, 600–602
See application file for complete search history.

(56) References Cited

U.S. PATENT DOCUMENTS

| | | | |
|---|---|---|---|
| 2006/0164442 A1* | 7/2006 | Furuhata et al. | 345/690 |
| 2010/0229194 A1* | 9/2010 | Blanchard et al. | 725/39 |
| 2010/0253815 A1* | 10/2010 | Kimura et al. | 348/254 |
| 2013/0307866 A1* | 11/2013 | Arai | 345/594 |

FOREIGN PATENT DOCUMENTS

JP 4829905 B2 9/2011

* cited by examiner

*Primary Examiner* — Victor Kostak
(74) *Attorney, Agent, or Firm* — Morgan, Lewis & Bockius LLP

(57) ABSTRACT

In a video display apparatus A, a controller 9, while displaying video processed by a video processor 4 on a video display 3, displays LUTs 45R, 45G, and 45B which are tables of correction data for correcting luminance levels of red, green, and blue respectively. The controller 9 re-calculates and rewrites the correction data based on one adjustment point or two or more adjustment points P1 and P2 adjusted by the user.

20 Claims, 11 Drawing Sheets

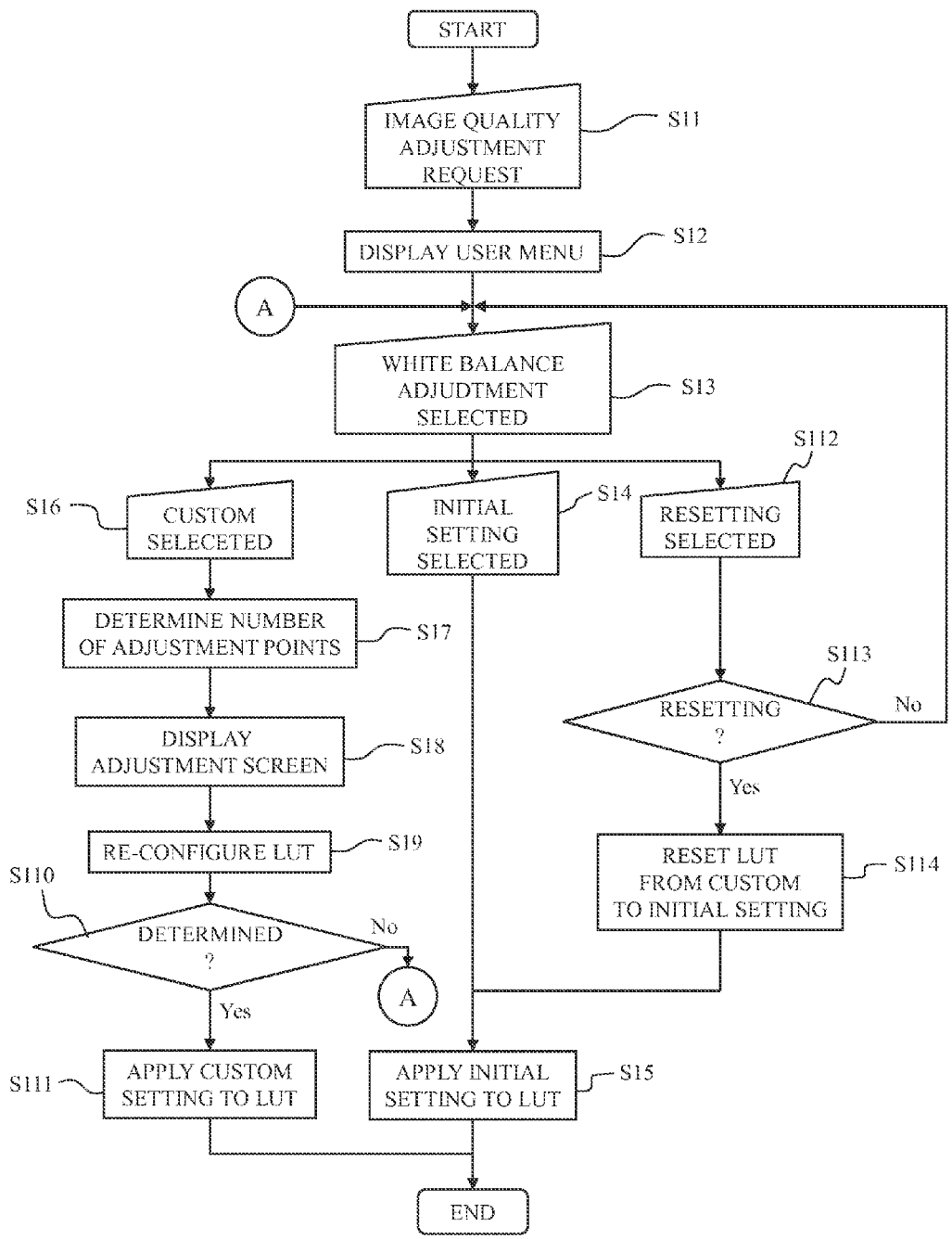

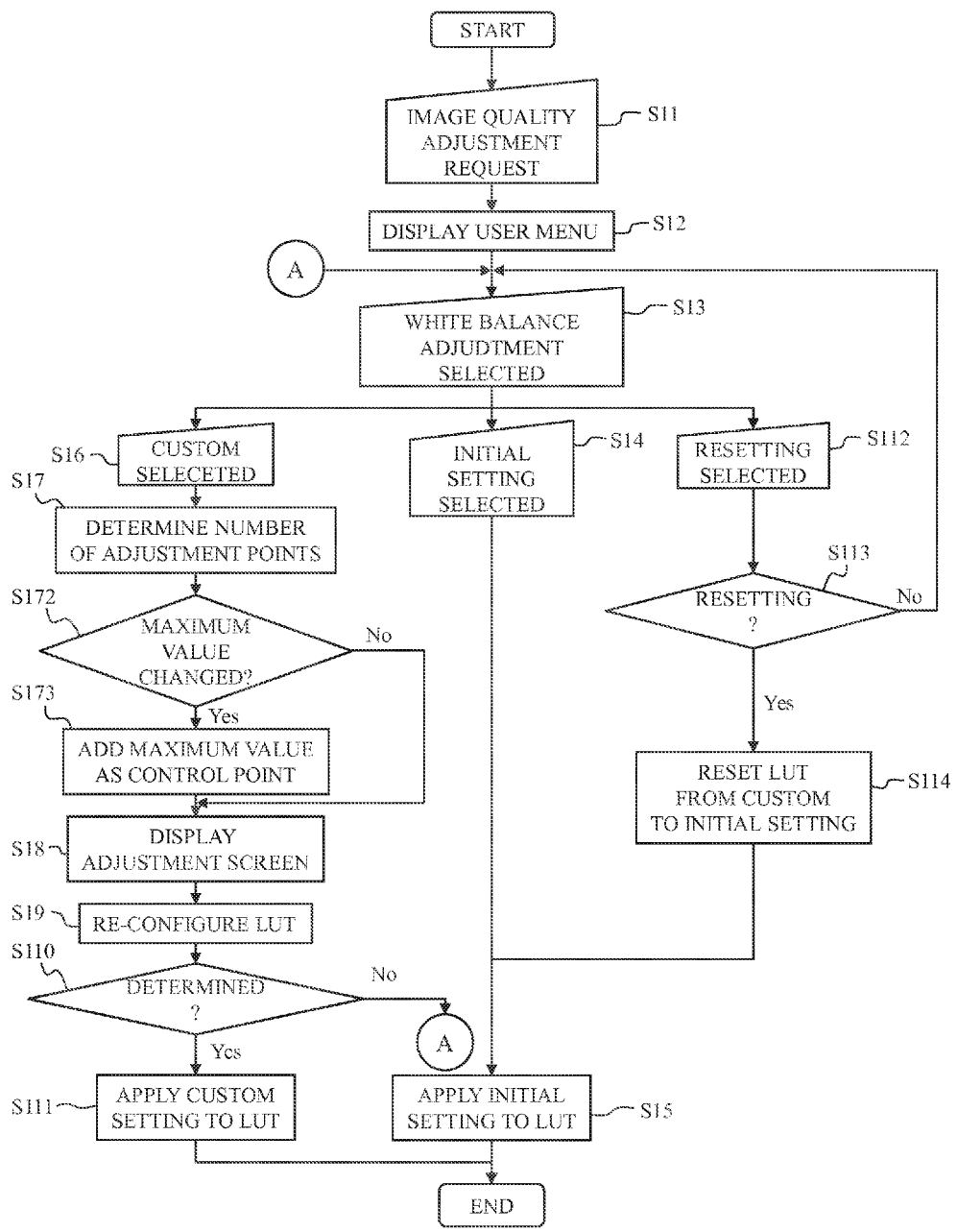

VIDEO DISPLAY APPARATUS HAVING A FUNCTION OF ADJUSTING COLOR BALANCE

The present application is based on, and claims priority from, Japanese Patent Application No. 2013-102263, filed on May 14, 2013, the disclosure of which is hereby incorporated by reference herein in its entirety.

BACKGROUND OF THE INVENTION

1. Field of the Invention

The present invention relates to video display apparatuses that display color video, and more particularly to video display apparatuses that have a function of adjusting the color balance.

2. Description of Related Art

A video display apparatus displays video on a display panel such as a liquid crystal panel based on a video signal (input signal) from an external device or from a broadcast wave. When the input signal is displayed unprocessed, the video display apparatus may, depending on the characteristics of the display panel, display video with varying display characteristics.

To cope with that, most video display apparatuses are, for the purpose of obtaining displayed video with desired display quality, provided with a corrector (circuit) for correcting the luminance of input data (gamma correction) and for adjusting the chromaticity thereof (white balance adjustment). As one such correction method, a correction method is used according to which an LUT (look-up table) is applied to an input signal to convert its gradation values to obtain a desired output (see, for example, Patent Document 1). By correcting the input signal in such a way, it is possible to display video with standard display quality, and to form video with luminance that suits the user's preference.

According to Japan Patent Publication No. 4829905 (Patent Document 1), the user arbitrarily sets a maximum input value and a minimum input value along with a control value. Based on these values, conversion data for obtaining a curve (gamma curve) for gamma correction is recorded in an LUT, and by use of this LUT, gamma correction is performed. By a gamma correction method like this, it is possible to adjust luminance levels properly over a wide range of input gradations.

However, in gamma correction according to Patent Document 1, to determine conversion data, it is necessary to set three points, namely a maximum point which takes the maximum input gradation value within the adjustment range, a minimum point which takes the minimum input gradation value there, and an arbitrary adjustment point between the maximum and minimum points. Thus, gamma correction takes time and trouble. This method of determining set values of conversion data for gamma correction can be used in white balance adjustment. However, it is then necessary to determine conversion data for each of R, G, and B data of an input signal. This takes more time and more trouble, which is inconvenient to the user.

SUMMARY OF THE INVENTION

The present invention aims to provide a video display apparatus that permits white balance adjustment on input video through intuitive operation and with accuracy desired by the user.

According to one aspect of the present invention, a video display apparatus is provided with: a video processor which adjusts the white balance of video data inputted thereto and then outputs the video data; a video display which displays the video data outputted from the video processor; and a memory which is provided in the video processor to store LUTs which are tables of correction data for individually correcting luminance levels of red, green, and blue in the inputted video data; and a controller. Here, the video processor corrects input values indicating luminance levels of red, green, and blue in the inputted video data based on the correction data in the LUTs and outputs corrected video data to the video display. On the other hand, the controller, while displaying video processed by the video processor on the video display, displays the LUTs which are tables of correction data for correcting luminance levels of red, green, and blue respectively, and re-calculates and rewrites the correction data based on one adjustment point, or two or more adjustment points, adjusted by the user.

With this video display apparatus according to one aspect of the present invention, while the user is viewing all the LUTs for correction of the R, G, and B luminance levels along with video corrected based on those LUTs, the re-calculation of the correction data proceeds. Thus, the user can confirm the result of the re-calculation immediately. It is thus possible to perform adjustment intuitively, and to cope with the user's requirements flexibly.

In the above-described video display apparatus according to one aspect of the present invention, preferably, the controller changes the number of adjustment points of the LUTs arbitrarily. With this configuration, it is possible to cope with the user's requirements flexibly, and to reduce the number of adjustment points to the minimum required by the user. It is thus possible to achieve enhanced convenience to the user during adjustment.

In the above-described video display apparatus according to one aspect of the present invention, preferably, the method of re-calculating the correction data in the LUTs includes a plurality of modes, and the controller re-calculates the correction data based on, of the plurality of modes, a mode selected by the user. With this configuration, it is possible to easily perform the re-calculation of the correction data for white balance adjustment desired by the user, and to achieve enhanced convenience to the user during adjustment.

In the above-described video display apparatus according to one aspect of the present invention, preferably, when the controller re-calculates the correction data in the LUTs, at least one of the minimum point and the maximum point of the range within which input values of the correction data in the LUTs fall is adjustable. With this configuration, it is possible to widen the range of white balance adjustment by the user, and to achieve enhanced convenience to the user during adjustment.

In the above-described video display apparatus according to one aspect of the present invention, preferably, when the controller re-calculates the correction data, video data fed in from outside is displayed on the video display. With this configuration, since actually watched video is displayed, a change in video resulting from white balance adjustment can easily be recognized intuitively. It is thus possible to achieve enhanced convenience to the user during adjustment.

In the above-described video display apparatus according to one aspect of the present invention, preferably, when the controller re-calculates the correction data, video data previously stored for adjustment is displayed on the video display. With this configuration, even when no video data is fed in from outside, white balance adjustment can be performed. It is thus possible to achieve enhanced convenience to the user during adjustment.

BRIEF DESCRIPTION OF THE DRAWINGS

FIG. 5 is a flow chart showing a procedure for white balance adjustment;

FIG. 14 is a flow chart showing a procedure for white balance adjustment.

DETAILED DESCRIPTION OF PREFERRED EMBODIMENTS

Embodiments of the present invention will be described with reference to the accompanying drawings.

First Embodiment

Figure 1:
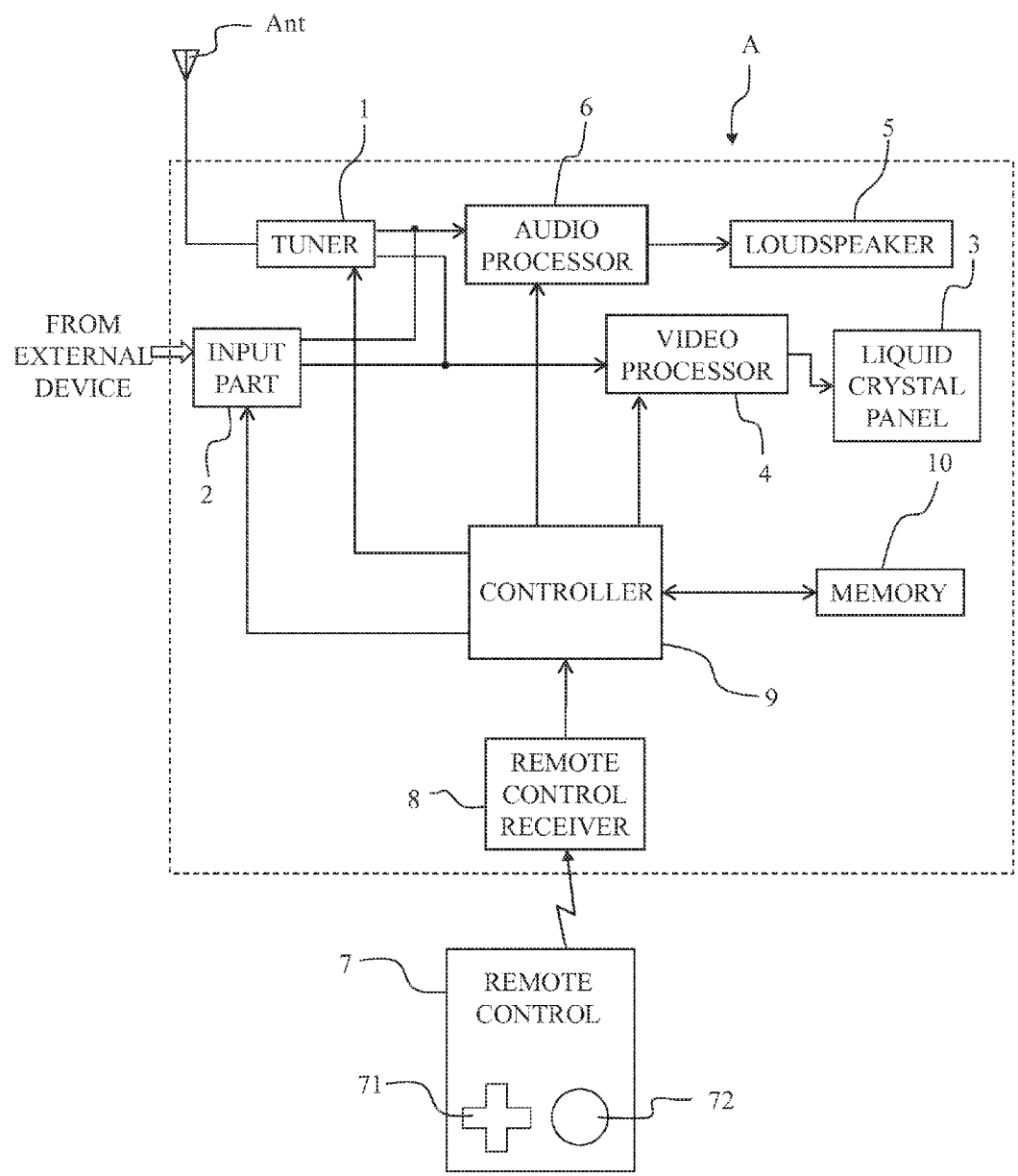
FIG. 1 is a block diagram showing an outline configuration of an LCD television set as one example of a video display apparatus according to the present invention.

FIG. 1 is a block diagram showing an outline configuration of an LCD (liquid crystal display) television set as an example of a video display apparatus according to the present invention. The LCD television set A shown in FIG. 1 receives broadcast waves such as terrestrial waves and satellite waves (BS, CS) to display and output, according to a broadcast wave, video based on video data and audio based on audio data.

The LCD television set A is provided with an LUT (look-up table) which is a table of correction data for adjustment of the displayed video. The LCD television set A corrects video based on video data according to the correction data in the LUT and then displays the video.

As shown in FIG. 1, the LCD television set A is provided with a tuner 1, an input part 2, a liquid crystal panel 3 (video display), a video processor 4, a loudspeaker 5, an audio processor 6, a remote control 7, a remote control receiver 8, a controller 9, and a memory 10.

An antenna Ant arranged outside the LCD television set A for receiving broadcast waves is connected to the tuner 1. A broadcast wave (terrestrial waves, BS, CS) received by the antenna Ant is demodulated and decoded to generate video data and audio data. The tuner 1 is controlled by the controller 9.

Video data and audio data from an external device such as a DVD player or a BD player (omitted from illustration) are fed to the input part 2. The tuner 1 and the input part 2 are each so configured as to be able to handle video data and audio data separately, so that video data is transmitted to the video processor 4 and audio data is transmitted to the audio processor 6. Other than an external device as mentioned above, a device (not shown) for feeding in adjustment video data for adjustment of the correction data in the LUT can be connected to the input part 2.

The liquid crystal panel 3 includes a backlight unit and a liquid crystal unit (neither is shown), and serves as a display for displaying video. The liquid crystal unit 3 can adjust the transmittance therethrough on a pixel-by-pixel (or subpixel-by-subpixel) basis. Based on video data from the video processor 4, the liquid crystal panel 3 properly adjusts the transmittance through the pixels to transmit the light from the backlight, and thereby displays video on the front surface.

The video processor 4 receives video data from the tuner 1 or from the input part 2. The video processor 4 is a device that applies correction processing to the video data. The video processor 4 is controlled by the controller 9, and will be described in detail later.

The audio processor 6 receives audio data from the tuner 1 or from the input part 2. The audio processor 6 applies various kinds of processing on the audio data, and feeds the processed audio data to the loudspeaker 5. The loudspeaker 5 outputs sounds based on the audio data fed from the audio processor 6.

The remote control 7 is an operation device for remote control of the LCD television set A. The remote control 7 accepts operation inputs from the user, and transmits operation signals containing information on the operation inputs to the remote control receiver 8. The transmission of signals from the remote control 7 to the remote control receiver 8 is achieved on a wireless basis, for example by light such as infrared light or by radio waves.

On receiving an operation signal, the remote control receiver 8 converts it into a reception signal that can be handled by the controller 9 and then transmits the result to the controller 9. In the LCD television set A, the controller 9 controls the tuner 1, the video processor 4, and the audio processor 6. A configuration is also possible where the controller 9 additionally controls any component other than those just mentioned. For example, the controller 9 can be configured to include a CPU or the like which performs arithmetic operations.

The controller 9 is connected to the memory 10. The memory 10 includes non-volatile and (or) volatile memory. In the memory 10, there are stored programs by which the controller 9 controls the operation of the LCD television set A, various kinds of data, etc. Based on these programs and various kinds of data, the controller 9 controls various kinds of operation of the LCD television set A. In the LCD television set A, the video processor 4 and audio processor 6 are assumed to be provided as independent circuits; these, however, can instead be programs that run in the controller 9. As will be described in detail later, in the memory 10, there are stored LUTs that are used for correction of video data is stored.

Figure 2:
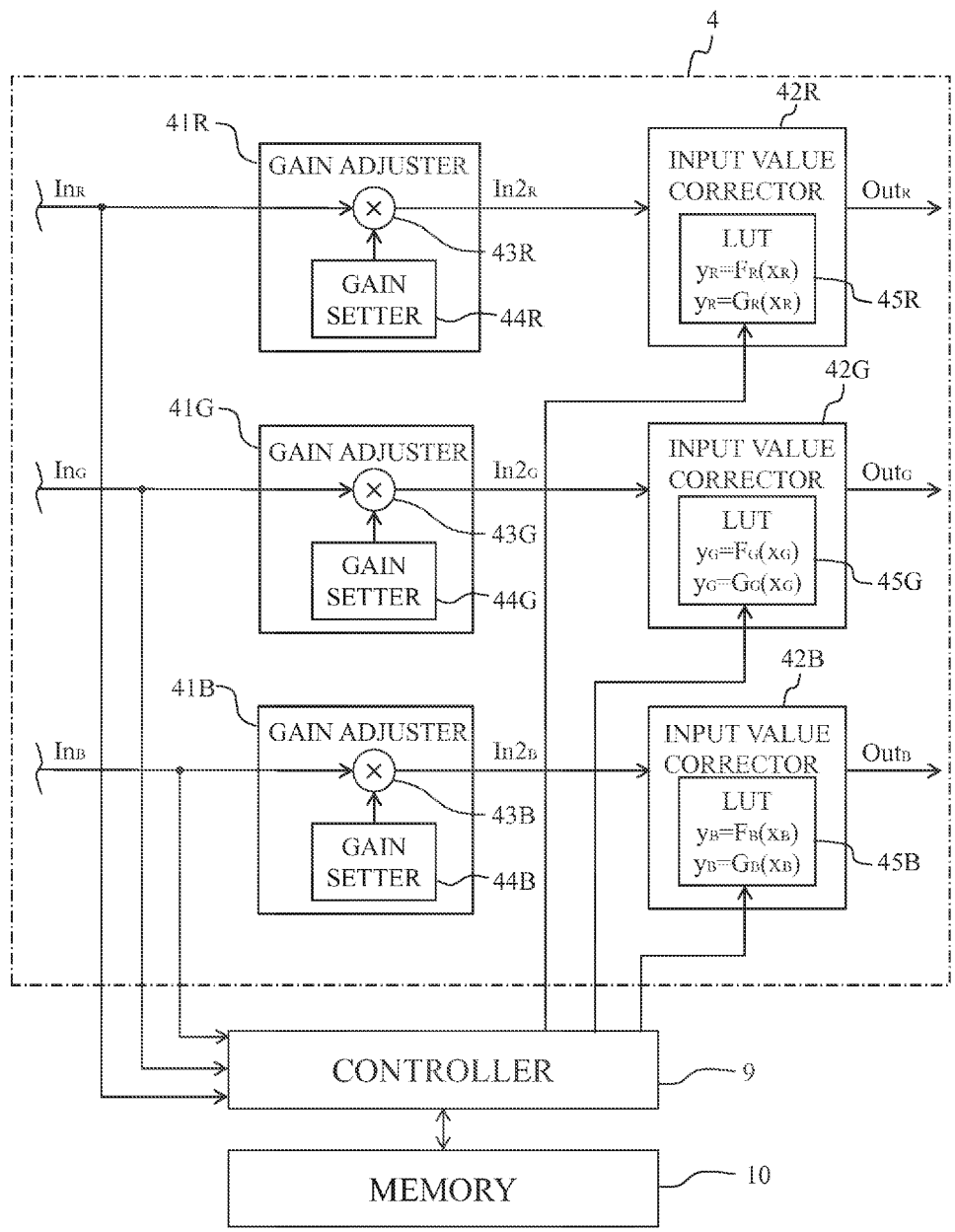
FIG. 2 is a block diagram showing electrical interconnection in one example of a video processor provided in a video display apparatus according to the present invention.

Next, an LCD television set as an example of an image display apparatus according to the present invention will be described in detail with reference to the relevant drawings. FIG. 2 is a block diagram showing an example of electrical interconnection in a video processor provided in a video display apparatus according to the present invention. The video processor 4 is a processor (circuit) that applies correction processing to the luminance levels of each of the colors red, green, and blue (R, G, and B) in video data, and receives an input value $In_R$ indicating the R luminance level, an input value $In_G$ indicating the G luminance level, and an input value $In_B$ indicating the B luminance level. In the following description, the subscripts R, G, and B indicate data of red, green, and blue respectively.

As shown in FIG. 2, the video processor 4 includes gain adjusters 41R, 41G, and 41B that adjust the R, G, and B input values respectively, and input value correctors 42R, 42G, and 42B that correct the input values. In the video processor 4, the input value $In_R$ is fed to the gain adjuster 41R, the input value $In_G$ is fed to the gain adjuster 41G, and the input value $In_B$ is fed to the gain adjuster 41B.

The gain adjusters 41R, 41G, and 41B give gains to the input values $In_R$, $In_G$, and $In_B$ which indicate the R, B, and G luminance levels respectively. The gain adjusters 41R, 41G, and 41B include multiplication circuits 43R, 43G, and 43B and gain setters 44R, 44G, and 44B respectively.

In the gain adjuster 41R, the multiplication circuit 43R multiplies the input value $In_R$ indicating the R luminance level by a gain value set in the gain setter 44R. Thus, a gain is given to the input value $In_R$ indicating the R luminance level. Likewise, in the gain adjuster 41G, the multiplication circuit 43G multiplies the input value $In_G$ indicating the G luminance level by a gain value set in the gain setter 44G, so that a gain is given to the input value $In_G$ indicating the G luminance level. Likewise, in the gain adjuster 41B, the multiplication circuit 43B multiples the input value $In_B$ indicating the B luminance level by a gain value set in the gain setter 44B, so that a gain is given to the input value $In_B$ indicating the B luminance level. Let the values indicating the luminance levels of the individual colors after being given the gains be $In2_R$, $In2_G$, and $In2_B$, and let the values of the gains given by the gain setters 44R, 44G, and 44B (set in the gain setters 44R, 44G, and 44B) be $G_R$, $G_G$, and $G_B$, then the following equations hold.

$$In2_R = G_R \times In_R$$

$$In2_G = G_G \times In_G$$

$$In2_B = G_B \times In_B$$

The input value correctors 42R, 42G, and 42B are (circuits) for adjusting the chromaticity (white balance) of the video displayed on the liquid crystal panel 3. The input value correctors 42R, 42G, and 42B include LUTs 45R, 45G, and 45B respectively.

The LUTs 45R, 45G, and 45B are tables of correction data for correcting the color balance of the video displayed on the liquid crystal panel 3. The correction data in the LUTs 45R, 45G, and 45B is data that indicates the correlation between uncorrected values which indicate the R, G, and B luminance levels before correction and corrected values which are outputted as a result of the correction. That is, the correction data in the LUT 45R is data that indicates the correlation between an uncorrected value $x_R$, which is the value indicating the R luminance level before correction, and a corrected value $y_R$, which is the value after the correction; the correction data in the LUT 45G is data that indicates the correlation between an uncorrected value $x_G$, which is the value indicating the G luminance level before correction, and a corrected value $y_G$, which is the value after the correction; and the correction data in the LUT 45B is data that indicates the correlation between an uncorrected value $x_B$, which is the value indicating the B luminance level before correction, and a corrected value $y_B$, which is the value after the correction.

As shown in FIG. 2, in the video processor 4, the input value correctors 42R, 42G, and 42B correct, based on the correction data in the LUTs 45R, 45G, and 45B, the input values $In2_R$, $In2_G$, and $In2_B$ given the gains by the gain adjusters 41R, 41G, and 41B. That is, the input value corrector 42R, referring to the LUT 45R, takes the input value $In2_R$ as the uncorrected value $x_R$, and outputs the corresponding corrected value $y_R$ as an output value $Out_R$. Likewise, the input value corrector 42G, referring to the LUT 45G, takes the input value $In2_G$ as the uncorrected value $x_G$, and outputs the corresponding corrected value $y_G$ as an output value $Out_G$. Likewise, the input value corrector 42B, referring to the LUT 45B, takes the input value $In2_B$ as the uncorrected value $x_B$, and outputs the corresponding corrected value $y_B$ as an output value $Out_B$.

The output values $Out_R$, $Out_G$, and $Out_B$ outputted from (corrected by) the input value correctors 42R, 42G, and 42B are the outputs of the video processor 4, which are fed to the liquid crystal panel 3 so that video based on the output values $Out_R$, $Out_G$, and $Out_B$ is displayed on the liquid crystal panel 3.

As described above, in the video processor 4, the input values $In_R$, $In_G$, and $In_B$ which respectively indicate the R, B, and G luminance levels in video data are given gains $G_R$, $G_G$, and $G_B$ by the gain adjusters 41R, 41G, and 41B. The input values $In2_R$, $In2_G$, and $In2_B$ thus given the gains are then corrected based on the correction data in the LUTs 45R, 45G, and 45B by the input value correctors 42R, 42G, and 42B, and the output values $Out_R$, $Out_G$, and $Out_B$ are fed to the liquid crystal panel 3. Thus, the liquid crystal panel 3 displays video based on the output values $Out_R$, $Out_G$, and $Out_B$.

In the LCD television set A, the correction data in the LUTs 45R, 45G, and 45B are so set that the video displayed on the liquid crystal panel 3 has desired chromaticity characteristics (white balance characteristics). On the other hand, a user may want to change, as he likes, the white balance characteristics of the video displayed on the liquid crystal panel 3. Accordingly, in the LCD television set A, the LUTs 45R, 45G, and 45B can be re-calculated according to user operation so that the R, B, and G luminance levels can be corrected based on the result of the re-calculation.

Let the uncorrected values be $x_R$, $x_G$, and $x_B$, and let the corrected values be $y_R$, $y_G$, and $y_B$. Then the corrected values after correction based on the LUTs 45R, 45G, and 45B before re-calculation are given by the following equations.

$$y_R = F_R(x_R)$$

$$y_G = F_G(x_G)$$

$$y_B = F_B(x_B)$$

After the correction data is re-calculated so that the white balance of video is adjusted as desired by the user, the corrected values after correction based on the thus re-calculated LUTs 45R, 45G, and 45B are given by the following equations.

$$y_R = G_R(x_R)$$

$$y_G = G_G(x_G)$$

$$y_B = G_B(x_B)$$

Figure 3:
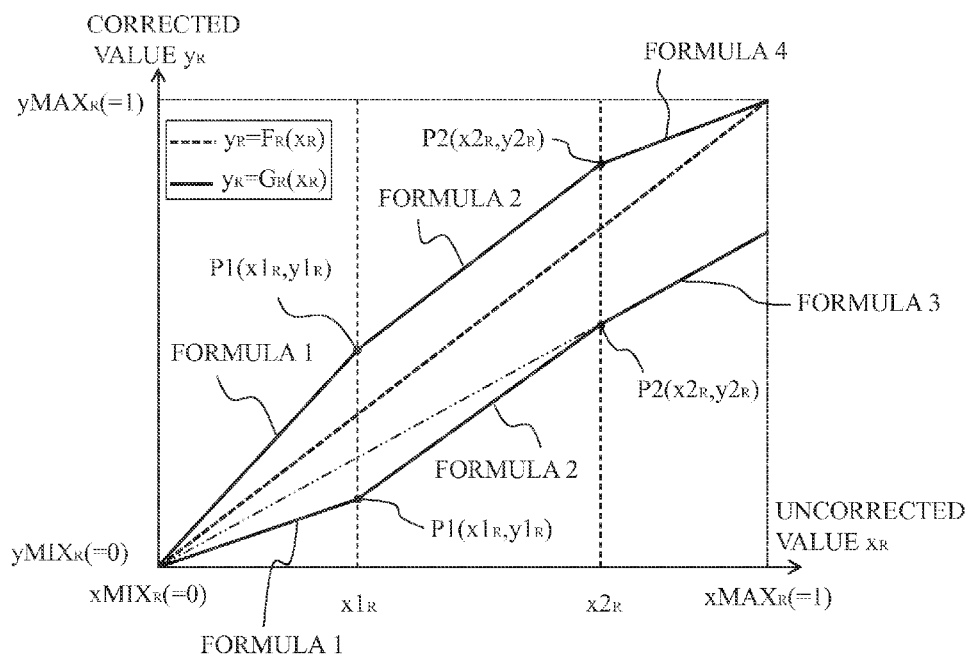
FIG. 3 is a diagram showing a method of re-calculation of correction data in an LUT.

Now, a configuration that permits the white balance of the LCD television set A to be adjusted (changed) as desired by the user will be described with reference to the relevant drawings. FIG. 3 is a diagram showing a method of re-calculation of the correction data in LUTs. For convenience' sake, FIG. 3 shows an LUT for correction of the R luminance level. FIG. 3 shows two sets of correction data, one for a case where the gain value at a second adjustment point is 1 or smaller and the other for a case where the gain value at a second adjustment point is greater than 1.

The user can set, between the minimum value $xMIN_R$ and the maximum value $xMAX_R$ of uncorrected values, two uncorrected values $x1_R$ and $x2_R$ at arbitrary points, and can arbitrarily set corrected values $y1_R$ and $y2_R$ corresponding to them. These user-settable points $P1(x1_R, y1_R)$ and $P2(x2_R, y2_R)$ will be referred to as a first adjustment point P1 and a second adjustment point P2. In FIG. 3, the uncorrected value $x_R$ falls within the range $xMIN_R (=0) \leq x1_R < x2_R \leq xMAX_R (=1)$. Let the minimum and maximum values of values that the corrected value $y_R$ can take be $yMIN_R$ and $yMAX_R$, then the corrected value $y_R$ falls within the range $yMIN_R (=0) \leq y1_R < y2_R \leq yMAX_R (=1)$.

In this embodiment, the re-calculation of the correction data is achieved through interpolation of values between the first and second adjustment points P1 and P2. Accordingly, the corrected value $y_R = G_R(x_R)$ are calculated differently in different parts of the range of the uncorrected value $x_R$.

For $xMIN_R \leq x_R \leq x1_R$, $$y_R = G_R(x_R) = F_R(Gain1_R \times x_R) \quad (1)$$

For $x1_R < x_R < x2_R$, $$y_R = G_R(x_R) = F_R(a0_R \times x_R + b0_R) \quad (2)$$

For $x2_R \leq x_R \leq xMAX_R$ and $Gain2_R \leq 1$, $$y_R = G_R(x_R) = F_R(Gain2_R \times x_R) \quad (3)$$

For $x2_R \leq x_R \leq xMAX_R$ and $Gain2_R > 1$, $$y_R = G_R(x_R) = F_R(a1_R \times x_R + b1_R) \quad (4)$$

where,
$a0_R = (x21_R - x11_R)/(x2_R - x1_R)$,
$b0_R = x11_R - x1_R \times (x21_R - x11_R)/(x2_R - x1_R)$,
$a1_R = (x2MAX_R - x21_R)/(xMAX_R - x2_R)$,
$b1_R = x21_R - x2_R \times (x2MAX_R - x21_R)/(xMAX_R - x2_R)$,
$x11_R = Gain1_R \times x1_R$,
$x21_R = Gain2_R \times x2_R$,
$x2MAX_R = xMAX_R$ $Gain1_R$ represents the gain value given to obtain a desired color balance at adjustment point P1, and
$Gain2_R$ represents the gain value given to obtain a desired color balance at adjustment point P2.

With respect to the G and B LUTs 45G and 45B, the correction data can be corrected in a similar manner. By use of the so re-calculated LUTs 45R, 45G, and 45B, video with a white balance as specified by the user can be displayed on the liquid crystal panel 3.

The method of re-calculation will now be described in detail. Depending on whether the gain $Gain2_R$ is 1 or smaller, or greater than 1, different formulae are used. In a standard setting, where input and output values are equal, a proportional correlation as indicated by a broken line in FIG. 3 is observed. FIG. 3 shows two cases, one with adjustment points above the broken line and the other with adjustment points below the broken line. For $x_R$ between $xMIN_R$ to $x2_R$, irrespective of whether the adjustment points are above or below the broken line, the correction data is re-calculated by use of the same interpolation formulae, namely formulae (1) and (2) above. On the other hand, when the second adjustment point P2 is located above the broken line, the gain $Gain2_R$ is greater than 1. In this case, to prevent saturation of luminance on the high-gradation side, the correction data is re-calculated according to formula (4).

By contrast, when the second adjustment point P2 is located below the broken line, the gain $Gain2_R$ is 1 or smaller. In this case, to prevent a sharp change in chromaticity, the correction data is re-calculated according to formula (3). By using LUTs containing correction data re-calculated as described above, it is possible to adjust white balance without inviting saturation on the high-gradation side. Although FIG. 3 shows cases where the first and second adjustment points P1 and P2 are located on the same side (above or below) of the broken line, they can be located on different sides.

Figures 4A, 4B, 4C:
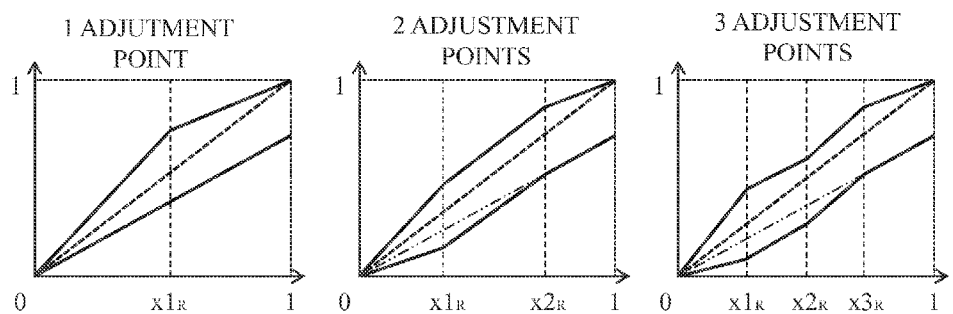
FIGS. 4A, 4B, and 4C are diagrams showing examples of LUTs for correction of R luminance levels, with one, two, and three adjustment points respectively.

FIGS. 4A, 4B, and 4C are diagrams showing examples of LUTs for correction of the R luminance level, with one, two, and three adjustment points respectively. In the method of re-calculation described above, two adjustment points are changed for re-calculation of the correction data. The number of adjustment points, however, is not limited to two: the number can be three or more, or one. In the case of a single adjustment point, formulae (1) is used in combination with formula (3) or (4). In the case of three or more adjustment points, interpolation between adjacent adjustment points is calculated by the interpolation formula of formula (2). Thus, correction data can be re-calculated with an increased or decreased number of adjustment points.

Now, a procedure for white balance adjustment in an LCD television set A as an example of an image display apparatus according to the present invention will be described with reference to the relevant drawings. How re-calculation is performed when the user wants to adjust video display characteristics is as described above. On the LCD television set A, in practice, it is preferable that the user be allowed to confirm the effected change while viewing the display on the screen. Accordingly, in the LCD television set A, the adjustment proceeds, while video is being displayed on the liquid crystal panel 3, with the LUTs 45R, 45G, and 45B displayed on an OSD (on-screen display) basis.

Figure 6:
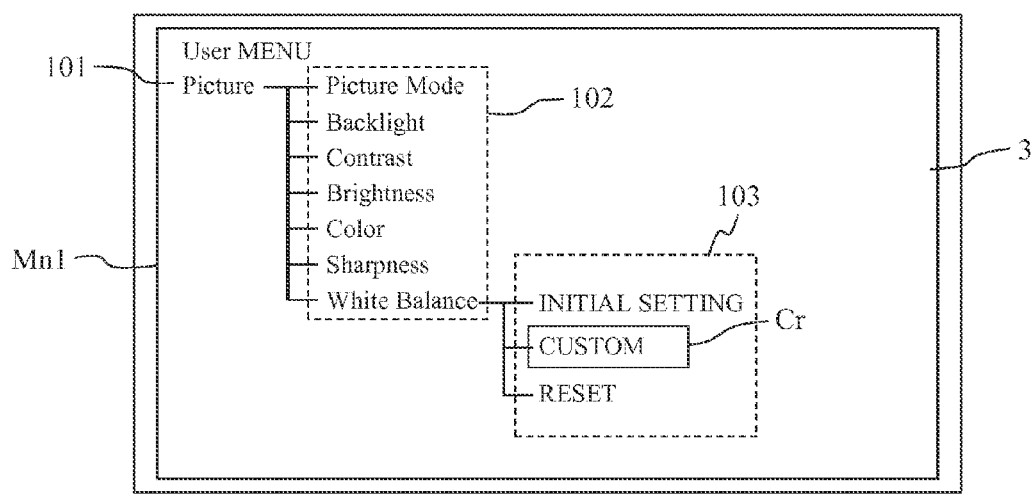
FIG. 6 is a diagram showing an example of a screen image displayed during adjustment of video.
Figure 7:
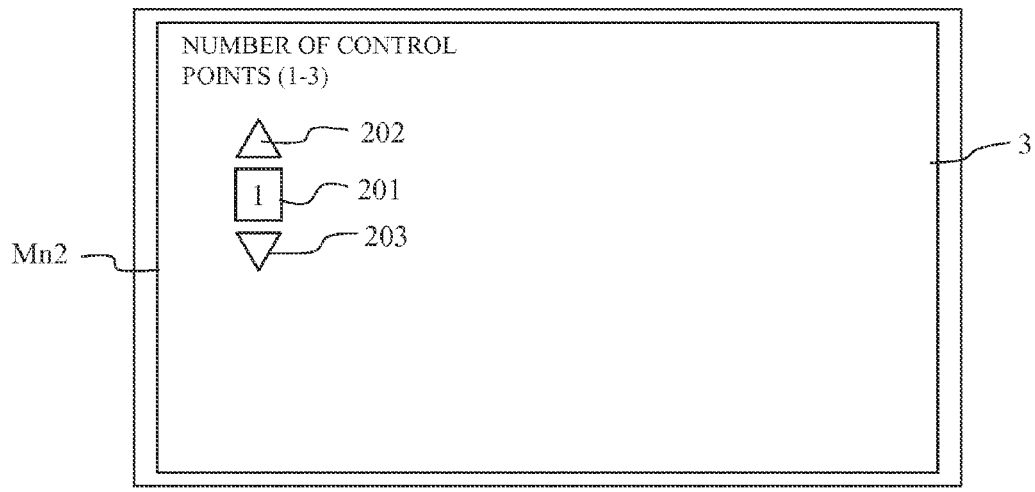
FIG. 7 is a diagram showing how the number of adjustment points is determined for white balance adjustment.
Figure 8:
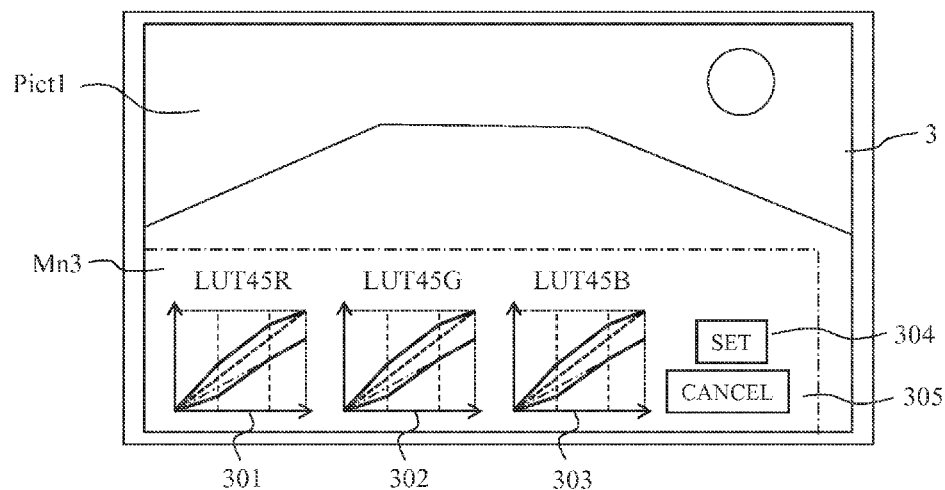
FIG. 8 is a diagram showing a screen image displayed on a liquid crystal panel during white balance adjustment.

FIG. 5 is a flow chart showing a procedure for white balance adjustment. FIG. 6 is a diagram showing an example of a screen image displayed for adjustment of video. FIG. 7 is a diagram showing how the number of adjustment points is set for white balance adjustment. FIG. 8 is a diagram showing a screen image displayed on the liquid crystal panel during white balance adjustment. The adjustment of video displayed on the liquid crystal panel 3 of the LCD television set A is controlled through operation of the remote control 7 by the user.

When the user operates the remote control 7 such that the controller 9 receives an operation input requesting video quality adjustment (step S11), white balance adjustment is started. The controller 9 transmits to the video processor 4 video data of a user menu screen Mn1, and the video processor 4 feeds the user menu screen Mn1, in the form of a video signal, to the liquid crystal panel 3. Thus, the user menu screen Mn1 is displayed on the liquid crystal panel 3 (step S12).

The user menu screen Mn1 will now be described. As shown in FIG. 6, the user menu screen Mn1 has a first display area 101, a first selection area 102, and a second selection area 103. In the first display area 101, there is shown what kind of operation the currently displayed user menu screen Mn1 is a menu screen for. It is here a menu for adjustment of video, and accordingly an indication "Picture" indicating video appears in the first display area 101.

In the first selection area 102, items that can be changed for adjustment of video are shown top to bottom. Here, the items include "Picture Mode," "Backlight," "Contrast," "Color," "Sharpness," . . . and "White Balance." "Picture Mode" is an item for selection among different adjustment settings (LUT) classified according to the type of displayed video (cinema, sports, news, etc.) or associated with abstract descriptors (bright, dim, sharp, etc.) "Backlight" is an item for adjustment of the brightness of backlight. "Contrast" is an item for adjustment of contrast. "Color" is an item for adjustment of colors. "Sharpness" is an item for adjustment of whether to make video appear sharp or soft. "White Balance" is an item for adjustment of white balance.

When one of these items is selected, the second selection area 103 appears for selection among more specific items. In the user menu screen Mn1 shown in FIG. 6, "White Balance" is selected, and thus in the second selection area 103, there are shown, as more specific items under "White Balance," "Initial Setting," "Custom", and "Reset." The second selection area 103 varies for different items in the first selection area 102.

In the user menu screen Mn1, to allow selection among items in the first selection area 102 and in the second selection area 103, a cursor Cr is displayed. The cursor Cr moves from one item to another as the remote control 7 is operated. In the user menu screen Mn1 shown in FIG. 6, the cursor Cr appears as a rectangular line-drawn box surrounding an item.

When, among the items in the first selection area 102 on the user menu screen Mn1, "White Balance" is selected (step S13), the second selection area 103 corresponds to "White Balance" is shown on the user menu screen Mn1 (see FIG. 6). When, among the items in the second selection area 103, "Initial Setting" is selected (step S14), the controller 9 transmits initially set correction data from the memory 10 to the LUTs 45R, 45G, and 45B in the video processor 4 so that the initially set correction data is applied (step S15). The initially set correction data is the correction data that is previously stored in the LCD television set A, and corresponds to the broken line in FIG. 3.

When, among the items in the second selection area 103 on the user menu screen Mn1, "Custom" is selected (step S16), the controller 9 retrieves from the memory 10 a screen image of the user menu Mn2 (see FIG. 7) for setting the number of adjustment points, and makes the video processor 4 display it on the liquid crystal panel 3. The user can now determine the number of adjustment points.

As shown in FIG. 7, the menu Mn2 has a selection box 201 along with an up button 202 and a down button 203. In the selection box 201, the number of adjustment points is shown. The down button 203 is operated to increase the number of adjustment points, and the down button 203 is operated to decrease it. By using the up button 202 and the down button 203, the user determines the number of adjustment points (step S17). Any other method of determining the number of adjustment points can be adopted: for example, the number can be entered directly by use of an input device, such as a numerical keypad, that allows entry of numbers. Too many adjustment points complicate the adjustment, and thus one to three points are discussed here; this, however, is not meant to be any limitation.

When the number of adjustment points is determined, the controller 9 retrieves a screen image of a white balance adjustment screen Mn3 (see FIG. 8) from the memory, and makes the video processor 4 display it on the liquid crystal panel 3 (step S18).

The adjustment screen Mn3 shown in FIG. 8 will now be described. On the adjustment screen Mn3, there are shown, side by side, a graph 301 representing the LUT 45R for correction of the R luminance level, a graph 302 representing the LUT 45G for correction of the G luminance level, and a graph 303 representing the LUT 45B for correction of the B luminance level. The adjustment screen Mn3 also has a SET button 304, which is operated to adopt the result of re-configuration of the LUTs 45R, 45G, and 45B, and a CANCEL button 305, which is operated to discard it. The adjustment screen Mn3 is arranged and displayed in a lower part on the liquid crystal panel 3.

Elsewhere than where the graphs 301, 302, and 303 are shown, arbitrary video is displayed. For example, in a case where a television broadcast received by the tuner 1 is being watched, or video data from the input part 2 is being watched, the liquid crystal panel 3 displays the video data from the tuner 1 or from the input part 2. In a case where the adjustment is performed with no signal being fed in from outside, the controller 9 retrieves a screen image for adjustment from the memory, and makes the video processor 4 display it on the liquid crystal panel 3. The screen image for adjustment can be used even when an external signal is being fed in. The screen image for adjustment is one of conventionally well-known screen images with a raster pattern, a gray ramp, a gray scale, etc. Here, a certain image Pictl fed from the input part 2 is being displayed.

The controller 9 shows the graphs 301, 302, and 303 (in a lower part on the screen in FIG. 8) such that these are superimposed on such video data. The size of the graphs 301, 302, and 303 can be previously determined, or can be set arbitrarily by the user. Preferably, the graphs 301, 302, and 303 are so sized that the user can view them all at the same time and can recognize the adjustment points easily.

When the adjustment screen Mn3 is displayed, the re-configuration of the LUTs 45R, 45G, and 45B, that is, the re-calculation of the correction data, is executed (step S19). The re-configuration of the LUTs proceeds, here, in the order from LUT 45R, to the LUT 45G, and then to LUT 45B.

First, an adjustment point on the graph representing the R LUT 45R is selected, and the re-calculation of the correction data in the R LUT 45R is started. How an adjustment point is adjusted will now be described with reference to FIG. 3. The adjustment of an adjustment point is performed by use of a cross (four-direction) key 71 and a SET key 72 (see FIG. 1) provided on the remote control 7. The cross key 71 is operated to move the adjustment point along $x_R$ and $y_R$ axes, and the SET key 72 is operated to finish the adjustment of the adjustment point.

FIG. 3 shows a case where two adjustment points are adjusted. The adjustment of the adjustment points starts with the one with the smaller uncorrected value $x_R$. Although omitted from illustration, an adjustment point may be indicated with a common cursor, or with a so-called cross-line cursor consisting of lines parallel to the $x_R$ and $y_R$ axes respectively and crossing each other at the adjustment point.

When the adjustment screen Mn3 is displayed, the adjustment point with the smaller uncorrected value $x_R$, specifically the first adjustment point P1 here, is selected. Changing the uncorrected value $x1_R$ of the first adjustment point P1 causes the first adjustment point P1 to move along the graph. In FIG. 3, solid lines represent re-calculated correction data. Thus, changing the uncorrected value $x1_R$ causes the corrected value $y1_R$ to change such that the first adjustment point P1 moves along the broken line. The changing of the uncorrected value $x1_R$ is stopped at an arbitrary value, and then the corrected value $y1_R$ is changed. Changing the corrected value $y1_R$ causes it alone to change, while the uncorrected value $x1_R$ remains unchanged. That is, changing the corrected value $y1_R$ causes the first adjustment point P1 to move off the broken line.

On completion of the adjustment of the first adjustment point P1, the controller 9 acquires the value of the first adjustment point P1 and, based on this value and formula (1), re-calculates the correction data between the minimum point $xMIN_R$ and the first adjustment point P1. On completion of the adjustment of the first adjustment point P1, the second adjustment point P2 is selected. The second adjustment point P2 is determined through similar operations as the first adjustment point P1.

When the second adjustment point P2 is determined, the controller 9 then, based on the values of the first and second adjustment points P1 and P2 and formula (2), re-calculates the correction data between the first and second adjustment points P1 and P2. It then likewise re-calculates the correction data between the second adjustment point P2 and the maximum point ($xMAX_R$, $yMAX_R$) based on formula (3) or (4). Which of formulae (3) and (4) to use is as described previously.

Here, the adjustment proceeds such that the first and second adjustment points P1 and P2 remain in a fixed positional relationship, that is, such that the first adjustment point P1 is always located closer to the origin of the $x_R$ axis than the second adjustment point P2 is. Moreover, the adjustment is performed such that the uncorrected value $x1_R$ of the first adjustment point P1 is greater than the minimum value $xMIN_R$ (=0) and the uncorrected value $x2_R$ of the second adjustment point P2 is smaller than the maximum value $xMAX_R$ (=1), and that, for both the first and second adjustment points P1 and P2, the corrected value $y_R$ is greater than the minimum value $yMIN_R$ (=0) but does not exceed the maximum value $yMAX_R$ (=1).

In the manner described above, the correction data in the LUT 45R for correction of the R luminance level is re-calculated. On completion of the re-calculation of the correction data in the LUT 45R, the graph 302, that is, the correction data in the G LUT 45G, is re-calculated. On completion of the re-calculation of the correction data in the LUT 45G, the graph 303, that is, the correction data in the B LUT 45B, is re-calculated. The re-calculation of the correction data in the LUTs 45G and 45B is performed in the same manner as that of the correction data in the LUT 45R, and therefore no overlapping description will be repeated.

As shown in FIG. 8, during the re-calculation of the correction data with the user viewing the LUTs 45R, 45G, and 45B, video is displayed on the liquid crystal panel 3. Meanwhile, a change in the LUTs 45R, 45G, and 45B is effected instantaneously (on a real-time basis), and thus the result of the re-calculation of the correction data is immediately reflected in the video being displayed. This allows the user to change an adjustment point while confirming the change in video resulting from the adjustment point being changed, and thus to intuitively preview the actual change.

On completion of the re-configuration of the LUTs 45R, 45G, and 45B, operation is waited for as to whether to determine the result of the re-configuration of the LUTs 45R, 45G, and 45B as "custom" data (step S110). If the CANCEL button 305 is selected and thus a choice not to determine but to discard it is made (step S110, "No"), a return is made to the display of the user menu screen Mn1 (step S12). If the SET button 304 is selected and thus a choice to determine the result of the re-configuration of the LUTs as "custom" data is made (step S110, "Yes"), the existing custom correction data is overwritten with the re-calculated correction data, and the new custom data is applied (step S111).

When, on the user menu screen Mn1, in the second selection area 103, "Reset" is selected (step S112), the controller 9 displays an indication suggesting whether to perform resetting, and detects an input by the user accepting or rejecting the suggestion (step S113). If it is detected that a choice not to perform resetting has been made (step S113, "No"), the controller 9 displays the user menu screen Mn1 (a return is made to step S12). If it is detected that a choice to perform resetting has been made (step S113, "Yes"), the controller 9 overwrites the current custom LUTs with initial values (here, the values in the initially set LUTs) (step S114), so that the initially set LUTs are applied (Step S15).

As described above, the user can adjust the LUTs corresponding to the colors R, G, and B respectively by moving an arbitrary number of adjustment points. And the user can do that while viewing video displayed. This permits the user to confirm what change the adjustment effects, and thus to adjust white balance intuitively.

Second Embodiment

Figure 9:
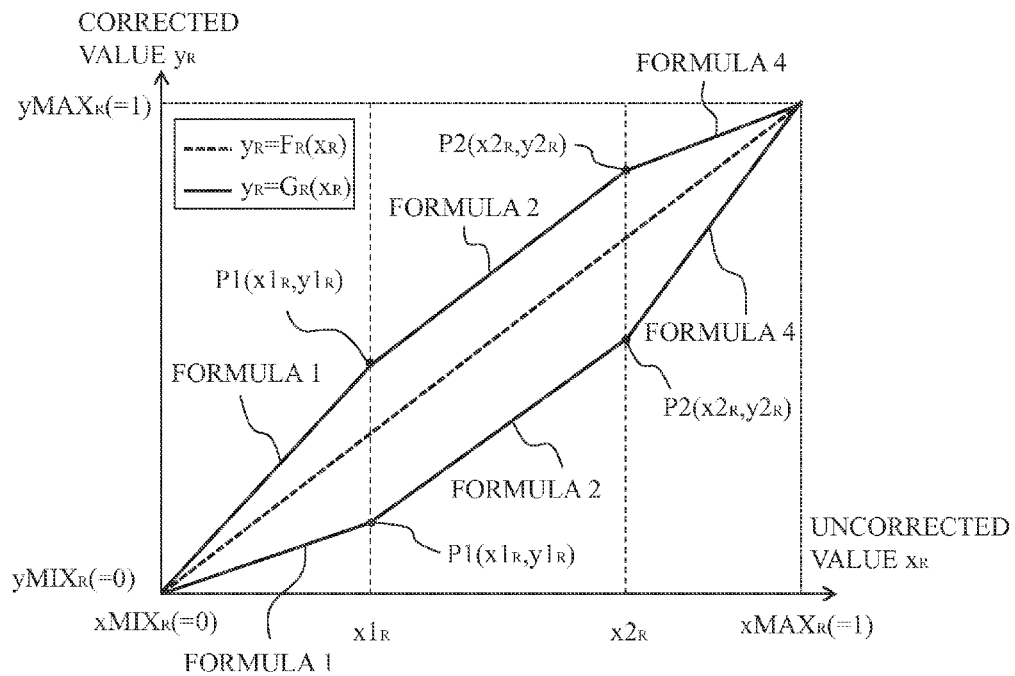
FIG. 9 is a diagram showing another example of an LUT used in video data processing in a video display apparatus according to the present invention.

Another example of an LCD television set as a video display apparatus according to the present invention will be described. FIG. 9 is a diagram showing another example of LUTs used in video data processing in a video display apparatus according to the present invention. The LCD television set of this embodiment is configured similarly to the LCD television set A of the first embodiment except that the LUTs are configured differently. Accordingly, equivalent parts between the two embodiments are identified by common reference signs, and no overlapping in-depth description will be repeated.

In the first embodiment, the LUTs in the video processor 4 of the LCD television set A re-calculate, when the gain $Gain2_R$ is 1 or smaller, the correction data such that uncorrected values and corrected values are in a proportional correlation. With this type of correction, however, even when the uncorrected value $x_R$ equals the maximum value $xMAX_R$, the corrected value $y_R$ is smaller than the maximum value $yMAX_R$. That is, when the gain $Gain2_R$ is 1 or smaller, luminance on the high-gradation side is low.

To avoid that, in this embodiment, when the gain $Gain2_R$ is 1 or smaller, luminance on the high-gradation side is corrected to be higher. The LUT 45R shown in FIG. 9 is, when the gain $Gain2_R$ is greater than 1, the same as the LUT 45R shown in FIG. 3, and therefore no overlapping in-depth description will be repeated.

In the LUT 45R shown in FIG. 9, even when the gain $Gain2_R$ is 1 or smaller, the correction data is re-calculated by use of formula (4). That is, for the uncorrected value $x_R$ between $xMIN_R$ and $x1_R$, re-calculation is performed by use of formula (1), and for the uncorrected value $x_R$ between the first and second adjustment points P1 and P2, re-calculation is performed according to formula (2). For re-calculation on the high-gradation side of the second adjustment point P2, irrespective of the value of the gain $Gain2_R$, formula (4) is used. Thus, corrected values are calculated such that, irrespective of the value of the gain $Gain2_R$, when the uncorrected value $x_R$ equals the maximum value $xMAX_R$, the corrected value $y_R$ equals the maximum value $yMAX_R$.

With this LUT, when the gain $Gain2_R$ is 1 or smaller, the correction data has a sharp change, which causes a sharp change in color temperature on the high-gradation side. It is then however possible to suppress a drop in luminance resulting from adjustment of white balance.

Third Embodiment

Figure 10:
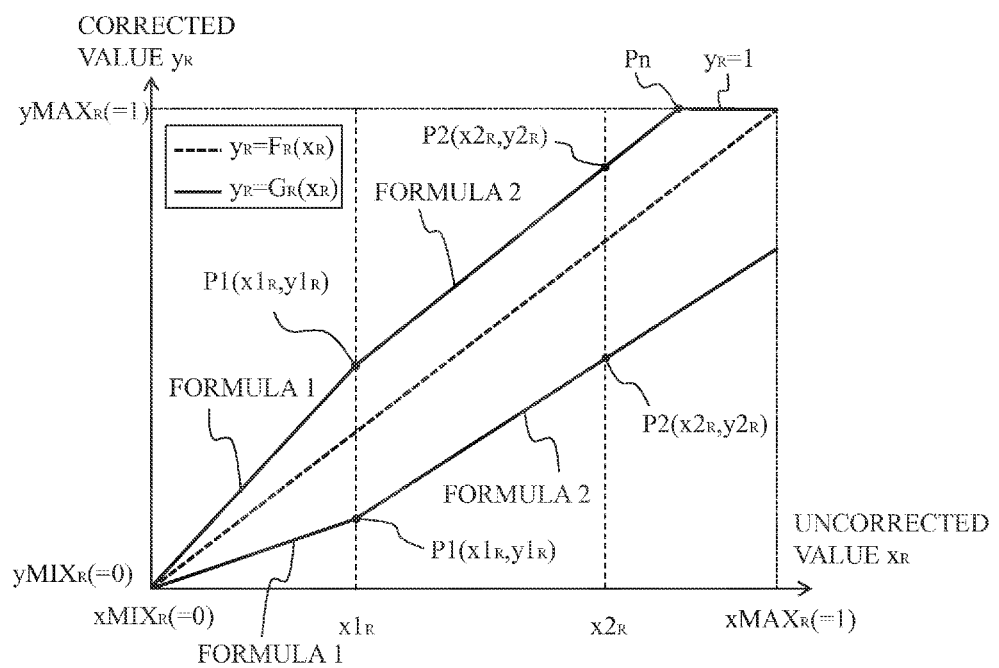
FIG. 10 is a diagram showing another example of an LUT used in video data processing in a video display apparatus according to the present invention.

Another example of an LCD television set as a video display apparatus according to the present invention will be described. FIG. 10 is a diagram showing another example of LUTs used in video data processing in a video display apparatus according to the present invention. The LCD television set of this embodiment is configured similarly to the LCD television set A of the first embodiment except that the LUTs are configured differently. Accordingly, equivalent parts between the two embodiments are identified by common reference signs, and no overlapping in-depth description will be repeated.

In the first embodiment, the LUTs in the video processor 4 of the LCD television set A re-calculate the correction data such that, on the high-gradation side (on the maximum value $xMAX_R$ side), corrected values do not exceed the maximum value $yMAX_R$. That is, the correction data is re-calculated such that the output is not saturated on the high-gradation side.

By contrast, in this embodiment, re-calculation is performed so as to tolerate saturation of the output on the high-gradation side. As shown in FIG. 10, the correction data in the LUT 45R is, in a region below the second adjustment point P2, re-calculated by the same calculation method as the LUT shown in FIG. 3. Specifically, for the uncorrected value $x_R$ between $xMIN_R$ and $x1_R$, re-calculation is performed according to formula (1), and for the uncorrected value $x_R$ between the first and second adjustment points P1 and P2, re-calculation is performed according to formula (2). On the high-gradation side of the second adjustment point P2, re-calculation is performed according to formula (2).

When the gain $Gain2_R$ is greater than 1, re-calculating the correction data on the high-gradation side of the second adjustment point P2 according to formula (2) causes corrected values to reach the maximum value $xMAX_R$ at a point Pn, that is, before the uncorrected value $x_R$ reaches the maximum value $yMAX_R$. Thereafter, even when the uncorrected value $x_R$ increases, the corrected value $y_R$ remains equal to maximum value $yMAX_R$. When the gain $Gain2_R$ is 1 or smaller, the corrected value $y_R$ is smaller than the maximum value $yMAX_R$, and thus the correction data is used without re-calculation.

With this LUT, luminance is saturated on the high-gradation side. On the other hand, it is easy to raise color temperature on the high-gradation side. That is, with the LUT shown in FIG. 10, although luminance on the high-gradation side is less accurate, white balance can be corrected with higher accuracy.

Fourth Embodiment

Figure 11:
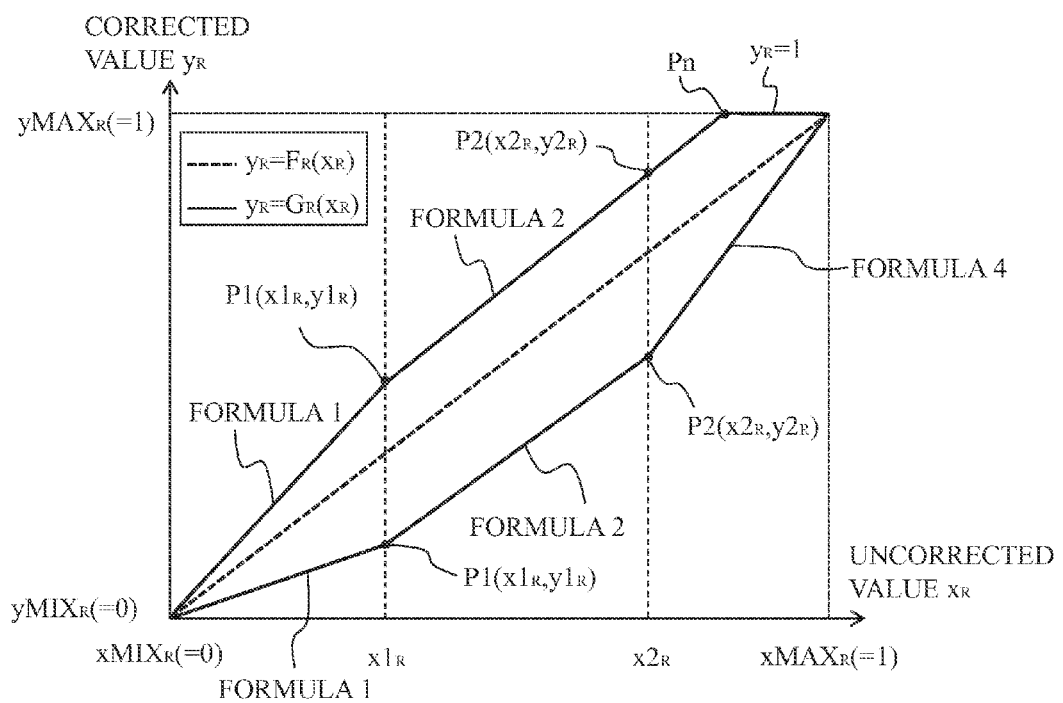
FIG. 11 is a diagram showing another example of an LUT used in video data processing in a video display apparatus according to the present invention.

Another example of an LCD television set as a video display apparatus according to the present invention will be described. FIG. 11 is a diagram showing another example of LUTs used in video data processing in a video display apparatus according to the present invention. The LCD television set of this embodiment is configured similarly to the LCD television set A of the first embodiment except that the LUTs are configured differently. Accordingly, equivalent parts between the two embodiments are identified by common reference signs, and no overlapping in-depth description will be repeated.

The LUT shown in FIG. 11 has, on the low-gradation side of the second adjustment point P2, the same correction data as the LUT shown in FIG. 3 etc. On the high-gradation side of the second adjustment point P2, the correction data is re-calculated differently depending on whether the gain $Gain2_R$ is 1 or smaller, or greater than 1.

Specifically, when the gain $Gain2_R$ is greater than 1, the correction data is re-calculated according to formula (2). That is, the correction data is re-calculated by the same calculation method as in the LUT shown in FIG. 10. By contrast, when the gain $Gain2_R$ is 1 or smaller, the correction data is re-calculated according to formula (4). That is, the correction data is re-calculated by the same calculation method as in the LUT shown in FIG. 9.

With this LUT, when the gain $Gain2_R$ is greater than 1, saturation of luminance on the high-gradation side is tolerated; when the gain $Gain2_R$ is 1 or smaller, it is only when the uncorrected value $x_R$ equals maximum value $xMAX_R$ that the corrected value $y_R$ equals the maximum value $yMAX_R$. During adjustment with the user viewing the graph, the video processor 4 can operate, if the second adjustment point P2 is set above the broken line, so as to tolerate saturation of luminance on the high-gradation side for increased accuracy of white balance adjustment and, if the second adjustment point P2 is set below the broken line, so as to suppress a drop in luminance on the high-gradation side during white balance adjustment.

Fifth Embodiment

Another example of an LCD television set as a video display apparatus according to the present invention will be described. As described above, the LUTs shown in FIGS. 8 to 11 each have distinctive characteristics. An LCD television set according to this embodiment is provided with those LUTs in the memory 10, and the controller 9 selects one of the corresponding modes according to selection by the user.

In the following description, the LUT shown in FIG. 8 corresponds to a "balance" mode for well-balanced adjustment of white balance and luminance. The LUT shown in FIG. 9 corresponds to a "suppressed luminance drop" mode for suppressing a drop in luminance resulting from white balance adjustment. The LUT shown in FIG. 10 corresponds to a "luminance priority" mode for obtaining increased luminance while tolerating a drop in the accuracy of white balance adjustment. The LUT shown in FIG. 11 corresponds to a "high luminance" mode for high luminance irrespective of the value of the gain $Gain2_R$.

Figure 12:
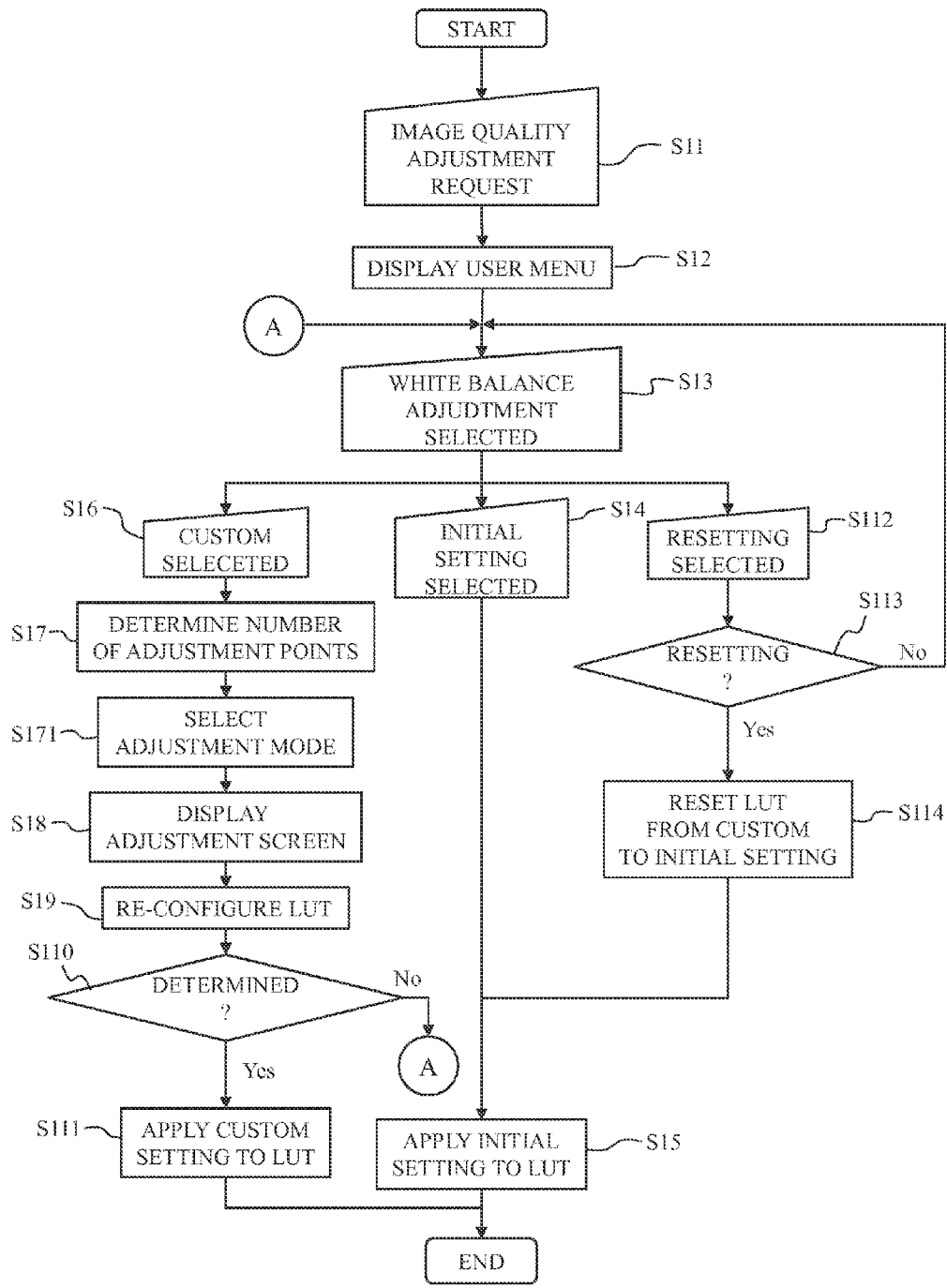
FIG. 12 is a flow chart showing a procedure for white balance adjustment.

FIG. 12 is a flow chart showing a procedure for white balance adjustment. The flow chart shown in FIG. 12 includes, between a step of determining the number of adjustment points (Step S17) and a step of displaying an adjustment screen (step S18), a step of selecting an adjustment mode (step S171). In other respects, this flow chart is the same as that shown in FIG. 5, and accordingly the following description focuses on differences.

As shown in FIG. 12, after the number of adjustment points is determined at step S17, the controller 9 detects an adjustment mode selected by the user among the "balance," "suppressed luminance drop," "luminance priority," and "high luminance" modes mentioned above (step S171). In this way, the controller 9 sets a calculation method for calculating the correction data in the LUTs corresponding to the selected mode. Thereafter, the controller 9 displays, on the liquid crystal panel 3, an image of the LUTs corresponding to the selected mode (step S18).

With this configuration, it is possible to flexibly cope with the user's requirements as to adjustment, and thus to perform advanced video adjustment. Although there are provided four adjustment modes here, this is not meant to be any limitation.

When an adjustment mode is set and an adjustment screen is displayed, the features of and tips for the selected mode can be displayed together.

Sixth Embodiment

Figure 13:
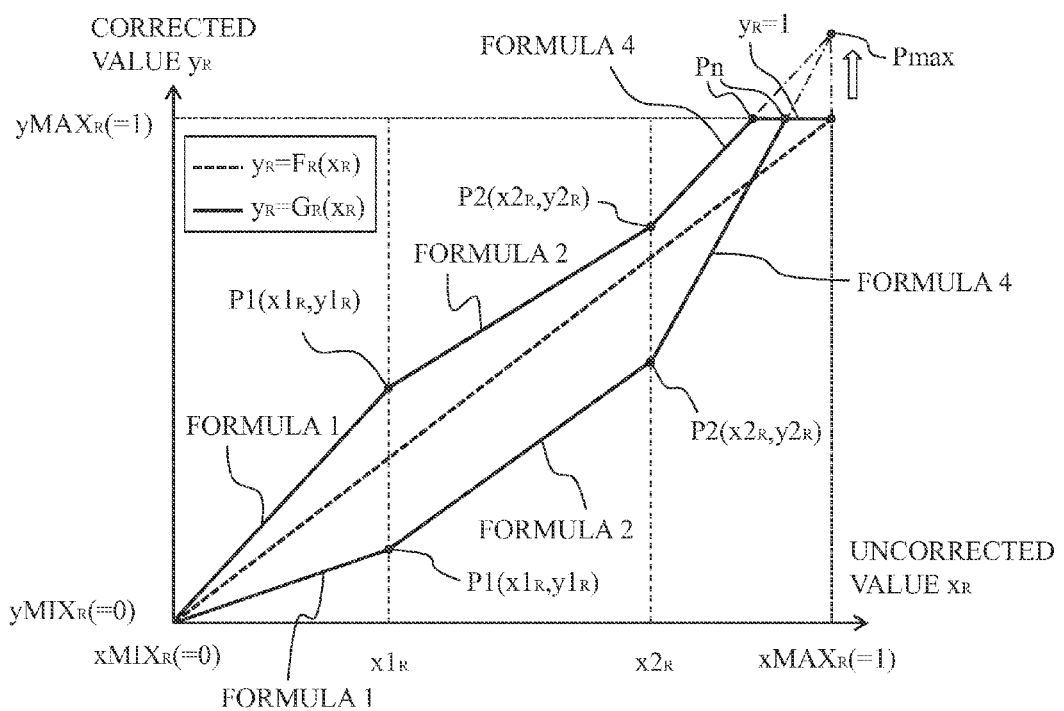
FIG. 13 is a diagram showing another example of an LUT used in video data processing in a video display apparatus according to the present invention.

Another example of an LCD television set as a video display apparatus according to the present invention will be described. FIG. 13 shows yet another example of LUTs used in video data processing in a video display apparatus according to the present invention.

In the embodiments described above, the LUTs are configured such that the corrected value $y_R$ falls within a previously determined range, that is, such that the minimum value $yMIN_R$ and the maximum value $yMAX_R$ are fixed values. However, leaving the minimum value $yMIN_R$ and the maximum value $yMAX_R$ adjustable can be useful in coping with the user's preferences. Accordingly, in this embodiment, the point at which the uncorrected value $x_R$ takes the maximum or minimum value is left adjustable as an adjustment point. In the adjustment method shown in FIG. 13, the point at which the uncorrected value $x_R$ equals the maximum value $xMAX_R$ is left adjustable as an adjustment point Pmax.

The method of re-calculation of the correction data in the LUT is the "suppressed luminance drop" mode shown in FIG. 9. When the correction data in the LUT is re-calculated, before or after the adjustment of the first and second adjustment points P1 and P2, the adjustment point Pmax is adjusted. As shown in FIG. 13, unlike the other adjustment points, the adjustment point Pmax is adjustable only in the $y_R$ direction. The adjustment point Pmax can even be moved in the direction in which the corrected value $y_R$ exceeds the maximum value $yMAX_R$, that is, upward in the FIG. 13. In this case, the adjustment point Pmax is an imaginary point, and takes a value that is used only for calculation of the values of the correction data.

In the LUT shown in FIG. 13, between the second adjustment point P2 and the adjustment point Pmax, the correction data is re-calculated by use of formula (4). In this case, when the uncorrected value $x_R$ equals the maximum value $xMAX_R$, it is located at Pmax, and thus, theoretically, the corrected value $y_R$ exceeds the maximum value $yMAX_R$. In practical terms, however, the corrected value $y_R$ does not exceed the maximum value $yMAX_R$; specifically, the corrected value $y_R$ reaches the maximum value $yMAX_R$ at point Pn, that is, before the uncorrected value $x_R$ reaches the maximum value $xMAX_R$. Thereafter, even when the uncorrected value $x_R$ increases, the corrected value $y_R$ remains equal to the maximum value $yMAX_R$ (=1).

The adjustment point Pmax can be set lower. In that case, the correction data is re-calculated with the corrected value $y_R$ at the adjustment point Pmax taken unchanged as the maximum value $yMAX_R$.

A procedure for white balance adjustment that permits adjustment of the maximum point and (or) the maximum point as descried above will now be described with reference to the relevant drawings. FIG. 14 is a flow chart showing a procedure for white balance adjustment. The flow chart shown in FIG. 14 includes, between a step of determining the number of adjustment points (step S17) and a step of displaying an adjustment screen (step S18), a step of detecting an instruction to change the maximum value (step S172) and a step of adjusting the maximum value as an adjustment point (step S173). In other respects, this flow chart is the same as that shown in FIG. 5, and therefore the following description focuses on differences.

After the number of adjustment points is determined (step S17), the controller 9 checks whether or not an instruction to change the maximum value of corrected values in the LUT has been entered by the user (step S172). If no instruction to change the maximum value has been entered (step S172, "No"), the controller 9 displays an adjustment screen (Step S18). By contrast, if an instruction to change the maximum value has been entered (step S172, "Yes"), the controller 9 adds as an adjustment point a point including the maximum value (step S173), and proceeds to a step of displaying an adjustment screen (Step S18).

By adjusting as an adjustment point the maximum point and (or) the minimum point in the LUT as described above, it is possible to obtain correction data that cannot be set conventionally. It is thus possible to more flexibly cope with the user's requirements.

The LUT described above assumes a case where an adjustment point on the maximum value side is adjusted, it is also possible to provide an adjustment point on the minimum value side and change that adjustment point. In that case, the formula used to re-calculate the correction data is not formula (1) but a separately defined interpolation formula.

In the embodiments described above, the correction data is re-calculated through linear interpolation between the adjustment points, the minimum point, and the maximum point. This, however, is not meant to be any limitation: any interpolation method other than linear interpolation may be used.

It should be understood that the embodiments by way of which the present invention has been described above are not meant to limit the scope of the invention in any way, and that those embodiments allow for many modifications and variations within the spirit of the invention.

What is claimed is:

1. A video display apparatus, comprising:
   a video processor which adjusts a white balance of video data inputted thereto and then outputs video data;
   a video display which displays the video data outputted from the video processor;
   a memory which is provided in the video processor to store LUTs which are tables of correction data for individually correcting luminance levels of red, green, and blue in the inputted video data;
   an operation unit which accepts input of an operation; and
   a controller,
   wherein:
      the video processor corrects input values indicating luminance levels of red, green, and blue in the inputted video data based on the correction data in the LUTs and outputs corrected video data to the video display,
      the controller, while displaying video processed by the video processor on the video display, displays the LUTs which are tables of correction data for correcting luminance levels of red, green, and blue respectively in a form of a graph whose mutually perpendicular axes indicate input and output respectively on the video display, the controller adjusting one adjustment point or two or more adjustment points set on the graph based on the input from the operation unit and re-calculating the correction data based on the graph after the adjustment, and
   the controller:
      selects a formula based on a result of comparison between an output value and a threshold value corresponding to an adjustment point on the graph where an input value is maximal,
      recalculates the LUTs from the adjustment point to an upper limit of the input values according to the selected formula, and
      rewrites the correction data.

2. The video display apparatus according to claim 1, wherein the controller changes the number of adjustment points of the LUTs arbitrarily.

3. The video display apparatus according to claim 1, wherein a method of re-calculating the correction data in the LUTs includes a plurality of modes using different formulae, and the controller re-calculates the correction data based on a mode among the plurality of modes, based on the input from the operation unit.

4. The video display apparatus according to claim 2, wherein a method of re-calculating the correction data in the LUTs includes a plurality of modes using different formulae, and the controller re-calculates the correction data based on a mode among the plurality of modes, based on the input from the operation unit.

5. The video display apparatus according to claim 1, wherein, when the controller re-calculates the correction data in the LUTs, at least one of a minimum point and a maximum point of a range within which input values of the correction data in the LUTs fall is adjustable.

6. The video display apparatus according to claim 2, wherein, when the controller re-calculates the correction data in the LUTs, at least one of a minimum point and a maximum point of a range within which input values of the correction data in the LUTs fall is adjustable.

7. The video display apparatus according to claim 5, wherein, when the controller re-calculates the correction data in the LUTs, at least one of a minimum point and a maximum point of a range within which input values of the correction data in the LUTs fall is adjustable.

8. The video display apparatus according to claim 1, wherein, when the controller re-calculates the correction data, video data fed in from outside is displayed on the video display.

9. The video display apparatus according to claim 2, wherein, when the controller re-calculates the correction data, video data fed in from outside is displayed on the video display.

10. The video display apparatus according to claim 3, wherein, when the controller re-calculates the correction data, video data fed in from outside is displayed on the video display.

11. The video display apparatus according to claim 5, wherein, when the controller re-calculates the correction data, video data fed in from outside is displayed on the video display.

12. The video display apparatus according to claim 7, wherein, when the controller re-calculates the correction data, video data fed in from outside is displayed on the video display.

13. The video display apparatus according to claim 1, wherein, when the controller re-calculates the correction data, video data previously stored for adjustment is displayed on the video display.

14. The video display apparatus according to claim 2, wherein, when the controller re-calculates the correction data, video data previously stored for adjustment is displayed on the video display.

15. The video display apparatus according to claim 1, wherein, between a lower limit of the input values and an adjustment point and, when there are two or more adjustment points, between a plurality of adjustment points, the controller re-calculates the LUTs according to a previously determined formula.

16. The video display apparatus according to claim 1, wherein:
the threshold value is an input value at an adjustment point, and
the formula is selected based on correlation between an output value and the threshold value.

17. The video display apparatus according to claim 1, wherein the adjustment point is adjusted by first determining input values for a previously given LUT and then changing output values corresponding to the input values.

18. The video display apparatus according to claim 3, wherein a mode is provided in which correction between a maximum value and an adjustment point, between adjustment values, and between an adjustment value and a minimum value is performed according to different formulae, respectively.

19. The video display apparatus according to claim 1, wherein the LUTs achieve correction such that, before the input values reach maximum values, corrected values reach the maximum values, and that, after the corrected values have reached the maximum values, irrespective of the formula, the maximum values are taken as the corrected values.

20. The video display apparatus according to claim 1, wherein:
points at which the input values are at upper and lower limits can be adjusted as adjustment points; and
calculation is performed such that output values when the input values are at the upper or lower limit are:
adjusted at imaginary points beyond a range of supposed maximum and minimum values of the output values; and
set at the maximum value when output values obtained by correcting the input values according to the LUTs are greater than the supposed maximum value and at the minimum value when output values obtained by correcting the input values according to the LUTs are smaller than the supposed minimum value.

* * * * *